US008596351B2

(12) United States Patent
Divine et al.

(10) Patent No.: US 8,596,351 B2
(45) Date of Patent: Dec. 3, 2013

(54) HORIZONTAL IN-WELL TREATMENT SYSTEM AND SOURCE AREA BYPASS SYSTEM AND METHOD FOR GROUNDWATER REMEDIATION

(75) Inventors: Craig E. Divine, Littleton, CO (US); Gaston Leone, Highlands Ranch, CO (US); Jeffery B. Gillow, Highlands Ranch, CO (US); Tracy Roth, Manchester, CT (US); Harry Brenton, Phoenix, AZ (US); Matthew S. Spurlin, Boulder, CO (US)

(73) Assignee: ARCADIS Corporate Services, Inc., Highlands Ranch, CO (US)

( * ) Notice: Subject to any disclaimer, the term of this patent is extended or adjusted under 35 U.S.C. 154(b) by 350 days.

(21) Appl. No.: 13/085,434

(22) Filed: Apr. 12, 2011

(65) Prior Publication Data

US 2012/0261125 A1 Oct. 18, 2012

(51) Int. Cl.
*E21B 43/22* (2006.01)
*B09C 1/10* (2006.01)

(52) U.S. Cl.
USPC ...................... 166/246; 166/278; 405/128.45

(58) Field of Classification Search
None
See application file for complete search history.

(56) References Cited

U.S. PATENT DOCUMENTS

| 5,833,388 | A | 11/1998 | Edwards et al. | |
|---|---|---|---|---|
| 2005/0082233 | A1* | 4/2005 | Ludwig et al. | 210/747 |
| 2009/0142137 | A1* | 6/2009 | Michailuck et al. | 405/128.7 |

OTHER PUBLICATIONS

Edwards, David A., Vincent B. Dick, James W. Little, and Susan L. Boyle, Refractive Flow and Treatment Systems: Conceptual, Analytical, and Numerical Modeling, Ground Water Monitoring & Remediation, Summer 2001, pp. 64-70, National Ground Water Association, Westerville, Ohio.
Faris, Bart and Dimitri Vlassopoulos, A Systematic Approach to In Situ Bioremediation in Groundwater, Remediation, Spring 2003, pp. 27-52, Wiley Periodicals, Inc.
Field Applications of In SituRemediation Technologies: Permeable Reactive Barriers, prepared by Environmental Management Support, Inc., 8601 Georgia Avenue, Suite 500, Silver Spring, MD 20910 under contract 68-W6-0014, work assignment 104, with the U.S. Environmental Protection Agency, Apr. 1999, U.S. Environmental Protection Agency, Office of Solid Waste and Emergency Response, Technology Innovation Office, Washington, DC 20460 Walter W. Kovalick, Jr., Ph.D., Director.

(Continued)

*Primary Examiner* — Zakiya W Bates
(74) *Attorney, Agent, or Firm* — Nancy J. Flint, Esq.; Nancy J. Flint, Attorney At Law, P.A.

(57) ABSTRACT

The application relates to a sustainable and green remedial approach for in situ remediation. The system and method use directionally drilled horizontal wells filled with granular reactive media generally installed in the direction of groundwater flow for groundwater remediation. "Flow-focusing" behavior is leveraged to capture and passively treat proportionally large volumes of groundwater in situ. The system and method perform well in low hydraulic conductivity environments. Reactive media are selected according to the contaminants to be treated and site characteristics The application further relates to a source area bypass system comprising one or more horizontal wells, constructed in a manner to allow unimpacted or cleaner groundwater to bypass a nonaqueous phase liquid zone or high-concentration source area of contamination and discharge downgradient. Reactive media may or may not be used in a source area bypass system. In some configurations, groundwater pumps may be installed to enhance performance.

18 Claims, 11 Drawing Sheets

(56) References Cited

OTHER PUBLICATIONS

Cost and Performance Report for Reductive Anaerobic Biological in Situ Treatment Technology (RABITT) Treatability Testing, Battelle Memorial Institute, 505 King Avenue, Columbus, Ohio 43201, Nov. 4, 2002, Air Force Research Laboratory, Materials & Manufacturing Directorate, Air Expeditionary Forces Technologies Division, 139 Barnes Drive, STE 2, Tyndall AFB FL, 32403-5323.

Hudak, Paul F., Viability of Longitudinal Trenches for Capturing Contaminated Groundwater, Bulletin of Environmental Contamination and Toxicology, Mar. 17, 2010, published online, Springer Science+Business Media, LLC.

Hudak, Paul F. Evaluation of reactive well networks for remediating heterogeneous aquifers, Journal of Environmental Science and Health Part A (2008) 43, pp. 731-737, Taylor & Francis Group, LLC.

Hudak, Paul F., Interior Versus Exterior Configurations of Passive Wells With Filter Cartridges for Cleaning Contaminated Groundwater, Remediation, Winter 2009, pp. 133-141, Wiley Periodicals, Inc.

Johnson, R.L., P.G. Tratnyek, R. Miehr, R.B. Thoms, and J.Z. Bandstra, Reduction of Hydraulic Conductivity and Reactivity in Zero-Valent Iron Columns by Oxygen and TNT, Ground Water Monitoring & Remediation 25, No. 1, Winter 2005, pp. 129-136, National Ground Water Association, Westerville, Ohio.

Morse, Jeff J., Bruce C. Alleman, James M. Gossett, Stephen H. Zinder, Donna E. Fennell, Guy W. Sewell, Catherine M. Vogel, Battelle Memorial Institute, 505 King Avenue, Columbus, Ohio 43201-2693, School of Civil Engineering, The Section of Microbiology, Cornell University Ithaca, NY 14853, Draft Technical Protocol: A Treatability Test for Evaluating the Potential Applicability of the Reductive Anaerobic Biological in Situ Treatment.

Nichols, Eric M., In a State of (Mass) Flux, Ground Water Monitoring & Remediation 24, No. 3, Summer 2004, pp. 4-5, National Ground Water Association, Westerville, Ohio.

Suthersan, Suthan S., Craig E. Divine, and Scott T. Potter, Remediating Large Plumes: Overcoming the Scale Challenge, Ground Water Monitoring & Remediation 29, No. 1, Winter 2009, pp. 45-50, National Ground Water Association, Westerville, Ohio.

Suthersan, Suthan S., Craig E. Divine, Joseph Quinnan, and Eric Nichols, Flux-Informed Remediation Decision Making, Ground Water Monitoring & Remediation 30, No. 1, Winter 2010, pp. 34-43, National Ground Water Association, Westerville, Ohio.

Wilson, Ryan D., Douglas M. Mackay, and John A. Cherry, Arrays of Unpumped Wells for Plume Migration Control by Semi-Passive In Situ Remediation, Ground Water Monitoring & Remediation, Summer 1997, pp. 185-193, National Ground Water Association, Westerville, Ohio.

* cited by examiner

HORIZONTAL IN-WELL TREATMENT SYSTEM AND SOURCE AREA BYPASS SYSTEM AND METHOD FOR GROUNDWATER REMEDIATION

FIELD OF THE INVENTION

The application relates to a sustainable and green remedial approach for in situ remediation. The system and method use directionally drilled horizontal wells filled with granular reactive media generally installed in the direction of groundwater flow for groundwater remediation. "Flow-focusing" behavior is leveraged to capture and passively treat proportionally large volumes of groundwater in situ. The system and method perform well in low hydraulic conductivity environments where the success of other in situ remediation methods is controlled by aquifer injectability. Reactive media are selected according to the contaminants to be treated and site characteristics. Energy conservation and other considerations result in considerable cost savings compared to current in situ remediation systems. According to another embodiment of the invention, a source area bypass comprises one or more horizontal wells, constructed in a manner to allow unimpacted or cleaner groundwater to bypass a nonaqueous phase liquid zone or high-concentration source area of contamination and discharge downgradient. Reactive media may or may not be used in a source area bypass. In some configurations, groundwater pumps may be installed to enhance performance. Core elements of green remediation according to the United States Environmental Protection Agency are achieved.

BACKGROUND OF THE INVENTION

During the past two decades the science and implementation of in situ groundwater remediation through the subsurface injection of liquid remedial agents has advanced substantially, and these techniques are now successfully employed in many settings. Most commonly, these strategies involve the injection of a specialized reagent solution into an aquifer in order to create a zone within the aquifer where enhanced biotic and/or abiotic reactions occur in situ to detoxify or destroy target contaminants. This general strategy is often referred to as an in situ reactive zone (IRZ) approach.

Enhanced reductive dechlorination (ERD) is one of the most widely-applied methods for treating chlorinated volatile organic compound (CVOCs) contaminants. In practice, ERD typically involves injecting an electron donor (usually a biodegradable form of organic carbon such as molasses, corn syrup, or vegetable oil) into the subsurface. Other similar commonly-employed strategies include the use of electron donors to support the biologically-mediated in situ conversion and precipitation of hexavalent chromium to trivalent chromium, and the injection of various chemical oxidants for the direct oxidation of applicable contaminants.

Although several important factors affect the implementability and potential success of an injected remedial fluid-based approach, relatively high hydraulic conductivity site conditions is one of the most important and desired site features, because this property controls the ease at which remedial fluids can be injected. For example, literature describing in situ remediation system design considerations identifies high aquifer hydraulic conductivity as a critical site property and screening criterion. See, e.g., Morse, J. J., Alleman, B. C., Gossett, J. M., Zinder, S. H., Fennelll, D. E., Sewell, G W., and Vogel, C. M., 1998. Draft technical protocol: A Treatability test for evaluating the potential applicability of the reductive anaerobic biological in situ treatment technology (RABITT) to remediate chloroethenes. Prepared for Environmental Security Technology Certification Program (ESTCP); Suthersan, S. S., 2002. Natural and enhanced remediation systems. CRC Press, Lewis Publishers, Boca Raton, Fla., 419 pp.; Gossett, J. M., Zinder, S. H., Fennel, D. E., Morey, C., and Adamson, D. T., 2003. Cost and performance report: Reductive anaerobic biological in situ treatment technology (RABITT) treatability testing. Prepared for Environmental Security Technology Certification Program (ESTCP); Faris, B., Vlassopoulos, D., and ITRC—In Situ Bioremediation Team, 2003. A Systematic approach to in situ bioremediation in groundwater. Remediation Journal 13: 27-52; Payne, F. C., and S. S. Suthersan., 2005. In Situ Remediation Engineering. CRC Press, Boca Raton, Fla. 511 pp; Payne, F. C., J. Quinnan, S. T. Potter. 2008. Remediation Hydraulics. CRC Press, Boca Raton, Fla.

In most cases, sites with low natural bulk hydraulic conductivity values (typically less than approximately 5 ft/day) are not considered ideal candidate sites for injected liquid-reagent-based in situ remedial strategies. This is primarily because at these sites, injection times necessary to deliver adequate reagent volume under non-fracturing pressures are prohibitively long. Consequently, many sites which might otherwise be good candidates for these types of strategies (that is, the contaminants are appropriate, geochemical conditions are favorable, and site use/infrastructure is compatible) are eliminated from conventional IRZ approaches or deemed less suitable solely because of the hydraulic challenges associated with remedial amendment delivery and distribution.

Injected reagent-based strategies are also challenged by the difficulty in delivering and distributing the reagent to the target zones within the plume. To some degree, this challenge has been overcome by optimizing the delivery and distribution of soluble substrates, through a renewed focus on the fundamental properties that govern groundwater movement and solute distribution at the remedial system scale. For example, it is now understood that large injection volumes are necessary to achieve lateral coverage due to the recognition that transverse dispersion of injected reagent is generally insignificant. See, e.g., Payne et al., 2008, supra. However, an important implication of this concept is that conventional batch-volume injection methods will not be technically-appropriate or cost-effective for large plumes. Large plume treatment with injected fluid reagents can only be practically accomplished when the flow field is artificially controlled by extraction-injection systems that facilitate larger well spacing. See, e.g., Suthersan, S. S., C. E. Divine, and S. T. Potter. 2009. Remediating large plumes: Overcoming the scale challenge. Ground Water Monitoring & Remediation 29, no 1: 34-43.

Furthermore, it is increasingly recognized that contaminant mass flux and discharge information provides the most useful measure of plume strength and potential risk to off-site receptors, and remedial approaches that focus on flux will increasingly be preferred to most effectively reduced risk. See, e.g., Nichols, E. M., 2004. In a state of (mass) flux. Ground Water Monitoring & Remediation 24, no. 3: 4-5; Suthersan, S. S., C. Divine, J. Quinnan, and E. Nichols. 2010. Flux-informed remediation decision making Ground Water Monitoring & Remediation 30, no 1: 45-50.

Finally, despite the widespread success of injected remedial reagent approaches for select contaminants, there still remain a large number of contaminants (e.g., select metals and radionuclides, polycyclic aromatic hydrocarbons, explosives and energetics, chlorides) that are not treatable, or their treatment is relatively undemonstrated by currently-available liquid-based remedial agents.

Additionally, while many soluble substrates (i.e., lactate, molasses and other organic carbon sources) are ideally suited to an injection approach, they are not ideal with respect to reaction rates since their effectiveness in contaminant destruction relies on promoting microbiological activity.

The concept of placing reactive media in vertically-oriented passive wells has been previously theoretically evaluated. See, e.g., Wilson, R. D., D. M., Mackay, and J. A. Cherry. 1997. Arrays of unpumped wells for plume migration control by semi-passive in situ remediation. Ground Water Monitoring & Remediation 21, no. 3: 185-193; Hudak, P. F. 2008. Evaluation of reactive well networks for remediating heterogeneous aquifers. J Environ Sci Health 43, no 7: 731-737; Hudak, P. F. 2009. Interior versus exterior configurations of passive wells with filter cartridges for cleaning contaminated groundwater. See Remediation 20, no. 1: 133-141. While theoretically plausible, the concept is not practical or cost-effective for most sites because the treatment widths for individual reactive wells are very small (roughly twice the well diameter) due to negligible flow-focusing, and therefore, many wells would be necessary to achieve a system width appropriate for typical plumes. Furthermore, the in-well residence times for these systems are very short (a few hours to a few days) and this may not be long enough to achieve treatment of some contaminants.

Passive reactive barrier (PRB) technology is well-developed and numerous field applications have been installed over the past decade. See USEPA 1999. Field applications of in situ remediation technologies: Permeable reactive barriers. EPA542-R-99-002, April 1999. Generally, PRB design consists of a reactive media-filled trench oriented orthogonal to the groundwater flow direction and is intended primarily to "cut off" the plume and control contaminant mass discharge at a discrete transect location, and many implementations utilize a "funnel-and-gate" system configuration to focus the treatment zone and reduce the volume of reactive media needed. Solids that have been used for in situ remediation include iron particles, limestone rock, oxide minerals, and particulate organics (e.g., mulch). These are generally emplaced in a trench-type PRB across the path of groundwater with the reactive solid media mixed with sand or gravel. However, this approach at applying solids in the treatment of plumes is not ideal: trenching is an expensive and difficult operation, reactive solid media have limited life-span and rehabilitation of the barrier is often not feasible, and often large portions of a plume cannot be treated because of limitations on trenching at a site. Other reactive media are also not available for use in trenches, such as ion-exchange resins and granular activated carbon (solids used successfully in ex-situ applications) due to the media cost and the need for large quantities to fill a trench.

Some limited work has been performed to evaluate the hydraulic performance of trench-based PRB systems oriented at non-orthogonal angles. See Edwards, D. A., and V. V. Dick. 1998. Method for directing groundwater flow and treating groundwater in situ. U.S. Pat. No. 5,833,388. Issued November 10; Edwards, D. A., V. V. Dick, J. W. Little, and S. L. Boyle. 2001. Refractive flow and treatment systems: Conceptual, analytical, and numerical modeling. Ground Water Monitoring & Remediation 21, no. 3: 64-70. Edwards et al. present a limited hydraulic capture analysis of a technique termed "refractive flow and treatment" (RFT), which consisted of fully-penetrating trenches installed in bedrock at oblique angles to ambient groundwater flow direction, and filled with highly-permeable inert material. The authors simulated the flowfield and hydraulic capture associated with "X" and chevron-shaped trench orientations and demonstrated that the trenches induce flow-focusing behavior. In concept, this captured water could be routed to a discrete zone where groundwater would be treated in situ by several possible technologies. Very recently, Hudak conducted some limited modeling of hypothetical reactive media-filled fully-penetrating PRBs used to treat the leading edge of synthetic plumes. See Hudak, P. F., 2010. Viability of longitudinal trenches for capturing contaminated groundwater. Bull Environ Contam Toxicol. Therein, Hudak evaluated several alternative orientations and his results suggest that PRB trenches oriented parallel to groundwater flow could result in faster treatment for the entire synthetic plume due to shorter average travel distances to the trench and associated reactive material.

While further work is needed to evaluate the potential benefits and the limitations of alternative orientations, there are important cost and implementability limitations associated with conventional PRBs. Trenching is relatively expensive as costs are particularly sensitive to trench depth. Additionally, the practical maximum trench depth attainable by available trenching technology is about 100 ft. Further, there are challenges associated with achieving adequate contaminant residence times for conventional orientations, and the hydraulic performance of many existing systems has been impacted by clogging and reduction in permeability, which can result in undesirable alteration of the flowfield and even plume spreading and bypass around the PRB. Reduction of hydraulic conductivity and reactivity in zero-valent iron columns by oxygen and TNT. Ground Water Mon. & Remd. 25(1): 129-136. Lastly, access issues such as buildings and utilities may limit the use of trenches. See, e.g., Johnson, R. L., P. G. Tratnyek, R. Miehr, R. B. Thoms, and J. Z. Bandstra, 2005.

SUMMARY OF THE INVENTION

The invention relates to a horizontal treatment (HRX) well system (also known as a horizontal in-well treatment (HIT) remediation system) comprising horizontal wells that can be installed within plumes of contaminated groundwater and oriented in the general direction of groundwater flow. Each well is filled with reactive treatment media (comprising, e.g., iron, granular activated carbon, zeolite). A flow-focusing phenomenon can be created by the high in-well hydraulic conductivity of the well and engineered reactive media relative to the surrounding aquifer hydraulic conductivity that passively draws impacted groundwater into the horizontal wells through a screen disposed substantially at the up-gradient portion of each well such that impacted groundwater is treated as it flows through the horizontal well. Treated groundwater then exits each horizontal well through a screen disposed substantially along the down-gradient section of the well.

According to one embodiment, the invention comprises a system for in situ remediation, comprising a plurality of well pipes disposed into an aquifer or plume to be treated for contamination, wherein further at least one part of one well pipe is disposed substantially horizontal to contaminated groundwater flow with respect to vertical and parallel to contaminated groundwater flow when viewed from the ground surface, wherein further at least one well pipe comprises a first section and a second section, wherein the first section comprises a first filter portion and a solid wall portion which is substantially permeable to groundwater flow, wherein the first filter portion is situated up-gradient of the flow of the contaminated groundwater within the aquifer or plume and the second section comprises a second filter portion and a solid wall portion which is substantially permeable to groundwater flow, wherein the second filter portion is situated down-gradient of the flow of the contaminated groundwater; wherein reactive media are placed into the interior of the well pipes, wherein the hydraulic conductivity of the reactive media situated in the interior of the well pipes is greater than the average hydraulic conductivity of the aquifer, wherein a portion of the flowing contaminated groundwater funnels into the first filter of the first section and exits through the second filter of the second section, wherein further the contaminated groundwater is treated by the reactive media as it passes through the interior of the well pipes. In one embodiment, the first section of the well pipe and the second section of the well pipe are disposed to form a "V" shaped or elongated "U" shaped well within the aquifer. In one embodiment, the well pipe further comprises a third section between the first section and the second section disposed substantially horizontal to the flow of groundwater in the contaminated aquifer or plume. In one embodiment, the third section comprises a solid section substantially impermeable to the contaminated groundwater or other environmental effects.

According to the method of the invention, a plume to be remediated is identified. A HRX well system comprising a plurality of wells having up-gradient and down-gradient screens or filters are installed such that they intersect the groundwater flow of the plume. The HRX well system details are designed depending on site conditions and specific design requirements, including but not limited to the HRX well system treatment width; the total contaminant mass to be treated; and contaminant concentration and mass reduction goals down-gradient of the HRX well system. Known horizontal directional drilling techniques can be used to drill and install the HRX wells. Reactive media can be placed in the interior of the HRX wells either before or after they are installed.

According to one embodiment, the invention comprises a method for in situ remediation, comprising: identifying an aquifer to be remediated; determining site qualities of the aquifer, including average hydraulic conductivity and the rate and direction of flow of contaminated groundwater through the aquifer; drilling a plurality of boreholes from the ground surface into the aquifer; inserting a plurality of well pipes into the boreholes, wherein further at least one part of one well pipe is disposed substantially horizontal to contaminated groundwater flow with respect to vertical and parallel to contaminated groundwater flow when viewed from the ground surface, wherein further at least one well pipe comprises a first section and a second section, wherein the first section comprises a first filter portion and a solid wall portion which is substantially permeable to groundwater flow, wherein the first filter portion is situated up-gradient of the flow of the contaminated groundwater; and the second section comprises a second filter portion and a solid wall portion which is substantially permeable to groundwater flow, wherein the second filter portion is situated down-gradient of the flow of the contaminated groundwater; and thereafter emplacing reactive media into the interior of the well pipes, wherein the hydraulic conductivity of the reactive media situated in the interior of the well pipes is greater than the average hydraulic conductivity of the aquifer, wherein a portion of the flowing contaminated groundwater funnels into the well pipes through the first filter of the first section, passes through the interior of the well pipes and exits through the second filter of the second section, wherein further the contaminated groundwater is treated by the reactive media as it passes through the interior of the well pipes. In one embodiment, the first section of the well pipe and the second section of the well pipe are disposed to form a "V" shaped or elongated "U" shaped well within the aquifer. In one embodiment, the well pipe further comprises a third section between the first section and the second section disposed substantially horizontal to the flow of groundwater in the contaminated aquifer or plume. In one embodiment, the third section comprises a solid section substantially impermeable to the contaminated groundwater or other environmental effects.

In another embodiment of the invention, a source area bypass (SAB) system comprises one or more horizontal wells, constructed in a manner to allow un-impacted or cleaner groundwater to bypass a non-aqueous phase liquid (NAPL) zone or high-concentration source area of contamination and discharge down-gradient of the contamination area. Reactive media may or may not be used in a SAB system. In some configurations, groundwater pumps may be installed to enhance performance.

The HRX well system compares favorably in sustainability analyses relative to conventional remedial approaches. Because the HRX well system operates passively in situ, recurring and cumulative energy requirements and carbon footprint are believed to be much lower compared to many other remedial alternatives. Additionally, recurring material use and waste generation are believed to be much lower, and the life-cycle water consumption would be essentially zero. Because the system is in situ and therefore requires minimal above-ground infrastructure and surface access, retention and potential enhancement and incorporation of natural resources would be high. Relative safety would be high due to the reduced number of wells required (i.e., fewer drilling locations and less drilling time), minimal above-ground construction (and associated electrical requirements and heavy equipment activity), absence of electrical or other power requirements, and the reduced site activities and operation and maintenance visits. Finally, the life-cycle costs for a HRX well system would be substantially lower than most conventional alternative remedial strategies, particularly if remedial performance goals are focused on mitigating risk through reducing contaminant mass flux and discharge. Although approximate, HRX well technology is a sustainable and green remedial approach.

DESCRIPTION OF THE DRAWINGS

The invention will be described with reference to the accompanying drawings, in which like elements are referenced with like numerals.

DETAILED DESCRIPTION OF THE INVENTION

Figure 1:
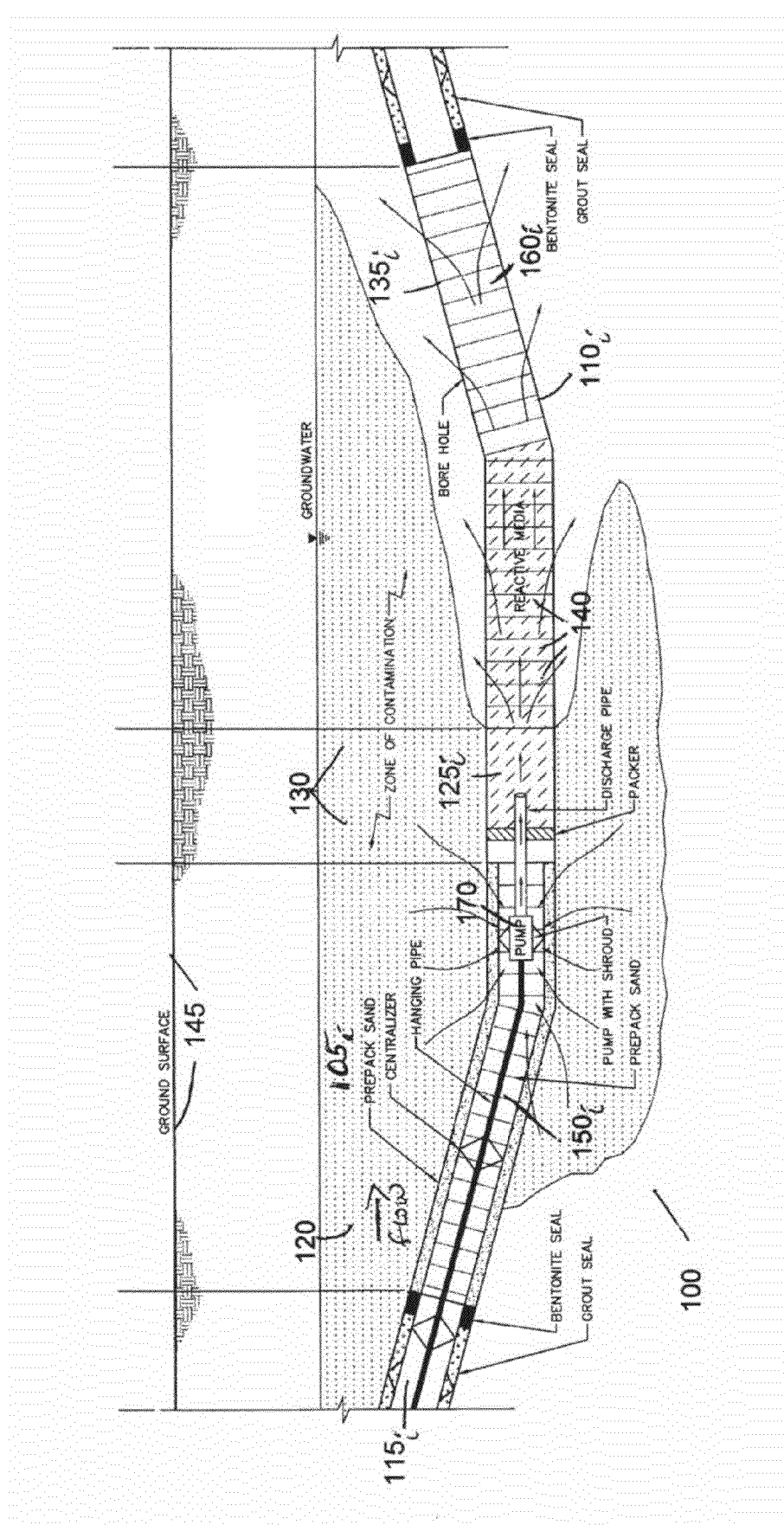
FIG. 1 provides an illustration of a HRX well system according to one embodiment of the invention.

The invention relates to a horizontal treatment (HRX) well system (also known as a horizontal in-well treatment (HIT) remediation system) comprising horizontal wells that are installed within plumes of contaminated groundwater and oriented in the general direction of groundwater flow. Each well is filled with reactive treatment media (comprising, e.g., iron, granular activated carbon, zeolite). A flow-focusing phenomenon is created by the high in-well hydraulic conductivity of the well and engineered reactive media relative to the surrounding aquifer hydraulic conductivity that passively draws impacted groundwater into the horizontal wells through a screen disposed substantially at the up-gradient portion of each well such that impacted groundwater is treated as it flows through the horizontal well. Treated groundwater then exits each horizontal well through a screen disposed substantially along the down-gradient section of the well.

According to one embodiment, the invention comprises a system for in situ remediation, comprising a plurality of well pipes disposed into an aquifer or plume to be treated for contamination, wherein further at least one part of one well pipe is disposed substantially horizontal to contaminated groundwater flow with respect to vertical and parallel to contaminated groundwater flow when viewed from the ground surface, wherein further the well pipes comprise a first section and a second section, wherein the first section comprises a first filter portion and a solid wall portion which is substantially permeable to groundwater flow, wherein the first filter portion is situated up-gradient of the flow of the contaminated groundwater within the aquifer or plume and the second section comprises a second filter portion and a solid wall portion which is substantially permeable to groundwater flow, wherein the second filter portion is situated down-gradient of the flow of the contaminated groundwater; wherein reactive media are placed into the interior of the well pipes, wherein the hydraulic conductivity of the reactive media situated in the interior of the well pipes is greater than the average hydraulic conductivity of the aquifer, wherein a portion of the flowing contaminated groundwater funnels into the well pipes through the first filter of the first section and exits through the second filter of the second section, wherein further the contaminated groundwater is treated by the reactive media as it passes through the interior of the well pipes. In one embodiment, the first section of the well pipe and the second section of the well pipe are disposed to form a "V" shaped or "U" shaped well within the aquifer. In one embodiment, the well pipe further comprises a third section between the first section and the second section disposed substantially horizontal to the flow of groundwater in the contaminated aquifer or plume. In one embodiment, the third section comprises a solid section substantially impermeable to the contaminated groundwater or other environmental effects.

According to one embodiment of the invention, a HRX well comprises a pipe of a diameter selected according to site conditions and specific design requirements. In one embodiment and without limiting the invention in any way, pipe diameters range from 8 inches to 18 inches. The pipes constituting the HRX wells may comprise any suitable material. In one embodiment and without limiting the invention in any way, pipes of the HRX wells are constructed of polyvinylchloride (PVC); other well materials may include high-density polyethylene (HDPE) or stainless steel.

A typical HRX well design will either require a pre-pack screen or, under the appropriate conditions, be installed with no sand pack and allow a natural filter pack develop. The pipes of the HRX wells further comprise an up-gradient filter and a down-gradient filter. The up-gradient filter comprises slotted or perforated pipe and is designed to allow groundwater to freely flow into the interior of the well while holding back the sandpack and native aquifer materials. The specific design and construction details of the filter are based on aquifer characteristics and design modeling. The down-gradient filter comprises slotted or perforated pipe and is designed to allow groundwater to freely flow into the well while holding back the sandpack and native aquifer materials. The specific design and construction details of the filter are based on aquifer characteristics and design modeling.

Reactive media are placed in the interior of the HRX wells. The reactive media are selected such that a differential is created between the hydraulic conductivity within the horizontal well and the aquifer. This hydraulic conductivity differential creates a "flow focusing" phenomenon which passively draws impacted groundwater into the HRX wells where it is treated with the reactive media as it passes through the HRX well. The residence time of the impacted groundwater within the HRX well can be determined according to site conditions and design requirements.

As described by Darcy's law, the passive flow rate through a horizontal well ($Q_{HRX}$) is:

$$Q_{HRX} = K_{HRX} \pi r_{HRX}^2 i_{HRX} \quad (1)$$

where $K_{HRX}$ is the hydraulic conductivity of the reactive media within the well, $r_{HRX}$ is the radius of the horizontal well, and $i_{HRX}$ is the hydraulic gradient along the well (approximately equal to the ambient aquifer hydraulic gradient, $i_A$ for wells that are mostly horizontal and oriented parallel to groundwater flow). The vertically-averaged treatment width ($w_{AVE}$) for an individual well within a HRX well system can then be approximated by:

$$w_{AVE} = \frac{Q_{HRX}}{K_A b_A i_A} \quad (2)$$

where $K_A$ is the average hydraulic conductivity of the aquifer and $b_A$ is the aquifer thickness intercepted by the horizontal well. The maximum potential average velocity $v_{AVE}$ and minimum average residence time $T_{AVE}$ can be estimated by:

$$v_{AVE} = \frac{Q_{HRX}}{\varphi_{HRX}} \quad (3)$$

$$T_{AVE} = \frac{L_{HRX}}{v_{HRX}} \quad (4)$$

where $\phi_{HRX}$ is the porosity of the reactive media within the horizontal well and $L_{HRX}$ is the average particle travel length within the he horizontal well. These equations provide only approximate estimates; actual velocity and particle travel distances profiles vary with depth and are influenced by the specific well design and aquifer conditions.

The flow field orientation with respect to the HRX well orientation can be varied according to one embodiment of the invention. The performance metrics for the various angled flow fields presented in Table 1 include well treatment width at the water table and ten feet below the water table, the total contaminant mass treated at the end of 900 days, and the total mass treated at 900 days normalized to the treatment well length.

TABLE 1

| Flow Field Orientation | Treatment Width at the Water Table (feet) | Treatment Width Ten Feet Below Water Table (feet) | Total Mass Treated at 900 days (lbs) | Total Mass Treated per Length at 900 days (lbs/ft-day) |
|---|---|---|---|---|
| Parallel Flow | 49 | 41 | 2522 | 0.0075 |
| 22.5 Degrees | 44 | 44 | 2532 | 0.0075 |
| 45 Degrees | 33 | 42 | 2346 | 0.0069 |
| 67.5 Degrees | 33 | 33 | 2144 | 0.0063 |
| 90 Degrees | — | — | 1389 | 0.0044 |

The results indicate greater treatment width and total mass treated is obtained when the treatment well is oriented parallel to the flow field.

Reactive media that can be used in the HRX well system include any granular form of media. Solids promote reactions at the reactive media surface-water interface, and are more attractive than liquid agents as reactive substrates due to their compatibility with a wider range of groundwater chemistry conditions and rapid reactivity. Generally, solid reactive media do not rely on microbial processes to be effective. Solids, emplaced within the HRX wells to promote groundwater contact, are isolated from aquifer soil and generally do not interact with soil, thereby minimizing generation of treatment byproducts (as is often the case for reactive substrates injected directly into the aquifer). Because of its demonstrated ability to treat a broad range of contaminants, iron is one of the most promising reactive media types for this application. Table 2 provides a summary of reactive media available and associated target contaminants that could potentially be used in a HRX well system.

TABLE 2

| Reactive Media Options | Contaminant |
|---|---|
| Zero valent iron (ZVI) | Chorinated solvents (CVOCs) |
| | Nitrate |
| | Perchlorate |
| | Metals |
| | Radionuclides |
| Bimetallics (ZVI + palladium (Pd), platinum (Pt), or nickel (Ni)) | CVOCs |
| Granulated activated carbon (GAC) | Halomethanes |
| Ion Exchange Resins | Brines |
| Zeolite | Radionuclides (including cesium and strontium) |
| Phosphates | Metals and radionuclides |

Other potential reactive media include magnetite, molecular sieve, mulch and apatite. Limestone or magnesium oxide may be used to generate alkalinity to treat acidic groundwater; conversely reactive sulfide minerals (such as iron sulfide) may be used to generate acidity to treat alkaline groundwater. Reactive media can be initially placed and subsequently replaced by the use of a Jet/Vac truck and/or tremie pipe.

Treatment widths of tens of feet of a plume per horizontal well are achievable under passive flow conditions in typical site settings, including lower-permeability settings. In contrast to injected fluid-based in situ strategies, the treatment performance of the HRX well system increases with decreasing aquifer hydraulic conductivity (due to the increased permeability contrast and flow-focusing). The results also demonstrate that the average treatment width is sensitive to well diameter and impacted aquifer thickness. Finally, these results are based on passive operation which relies on flow focusing due to the engineered permeability contrast; however, hydraulic capture and treatment width could be significantly increased by installing a pump with the intake at the up-gradient end of the horizontal well and the pumped water pushed through reactive media within the horizontal well (i.e., no effluent is brought to land surface).

According to the method of the invention, a plume to be remediated is identified. A HRX well system comprising a plurality of wells having up-gradient and down-gradient screens or filters are installed such that they intersect the groundwater flow of the plume. The HRX well system details are designed depending on site conditions and specific design requirements, including but not limited to the HRX well system treatment width; the total contaminant mass to be treated; and contaminant concentration and mass reduction goals down-gradient of the HRX well system. Known horizontal directional drilling techniques can be used to drill and install the HRX wells. Reactive media can be prepacked or can be placed in the interior of the HRX wells once they are installed.

According to one embodiment, the invention comprises a method for in situ remediation, comprising: identifying an aquifer to be remediated; determining site qualities of the aquifer, including average hydraulic conductivity and the rate and direction of flow of contaminated groundwater through the aquifer; drilling a plurality of boreholes from the ground surface into the aquifer; inserting a plurality of well pipes into the boreholes, wherein further at least one part of one well pipe is disposed substantially horizontal to contaminated groundwater flow with respect to vertical and parallel to contaminated groundwater flow when viewed from the ground surface, wherein further at least one well pipe comprises a first section and a second section, wherein the first section comprises a first filter portion and a solid wall portion which is substantially permeable to groundwater flow, wherein the first filter portion is situated up-gradient of the flow of the contaminated groundwater; and the second section comprises a second filter portion and a solid wall portion which is substantially permeable to groundwater flow, wherein the second filter portion is situated down-gradient of the flow of the contaminated groundwater; and thereafter emplacing reactive media into the interior of the well pipes, wherein the hydraulic conductivity of the reactive media situated in the interior of the well pipes is greater than the average hydraulic conductivity of the aquifer, wherein a portion of the flowing contaminated groundwater funnels into the first filter of the first section, passes through the interior of the well pipes and exits through the second filter of the second section, wherein further the contaminated groundwater is treated by the reactive media as it passes through the interior of the well pipes. In one embodiment, the first section of the well pipe and the second section of the well pipe are disposed to form a "V" shaped or elongated "U" shaped well within the aquifer. In one embodiment, the well pipe further comprises a third section between the first section and the second section disposed substantially horizontal to the flow of groundwater in the contaminated aquifer or plume. In one embodiment, the third section comprises a solid section substantially impermeable to the contaminated groundwater or other environmental effects.

HRX wells can be installed using currently known horizontal directional drilling (HDD), which is commonly used to install pipelines for water, sewer, gas, and conduits for fiber optics without using the traditional trenching method. Over the past two decades horizontal drilling methods have been used in a wide range of environmental applications. Drilling technology has been adequately developed and is readily available throughout the United States. Emplacement of reactive media in the HRX wells can be accomplished by the use of a tremie pipe or the use of a Jet/Vac truck.

Costs to install a HRX well system are expected to be similar to vertical well pump and treat systems. However, like any remediation well, costs to drill and install a HRX well will vary based on the hydrogeologic conditions, the length and diameter of the well, and the materials used to complete the well.

A pilot hole can be drilled by mud rotary drilling. In one embodiment, entry is approximately 15° from the ground surface. Once the depth of placement of the horizontal wells within the plume or aquifer is reached, the pilot hole is then reamed to the desired borehole diameter, ranging from 2 inches to 36 inches. Depth is generally not a limitation. The horizontal well pipes may comprise HDPE, SCH40 and SCH80 PVC or stainless steel. The specific HRX well system placement is dependent on the plume characteristics, site geology, and the results of pre-design modeling.

A performance monitoring program can comprise the installation of monitoring wells immediately up- and down-gradient of the HRX well system at various locations relative to predicted treatment widths as well as perpendicular to the flow of the treated clean water to monitor hydraulic head and water quality. Additionally, surface and/or downhole Electrical Resistivity (ER) can be used to map the treatment zone because in many applications water quality within the treatment zone may have a significantly reduced electrical conductivity signature due to reduction and removal of sulfate and precipitation of other minerals. To assess performance within the horizontal wells, inexpensive point velocity probes could be placed within the reactive media to quantify flow, velocities, and residence times. The geochemical performance of the reactive media could be confirmed through porewater chemistry collected through permanent sampling ports installed within the horizontal well. Additionally, a series of electrodes could be placed at regular intervals within the horizontal well to easily monitor changes in the reactive media electrical resistivity through time. This information can be used to verify where and how fast geochemical reactions are occurring, and provide information regarding reactive media depletion rates.

In another embodiment of the invention, a source area bypass (SAB) system comprises one or more horizontal wells, constructed in a manner to allow unimpacted or cleaner groundwater to bypass a non-aqueous phase liquid (NAPL) zone or high-concentration source area of contamination and discharge down-gradient of the contamination area. Horizontal wells of an SAB system comprise an up-gradient filter and a down-gradient filter. SAB system horizontal wells are either void in the interior of any media or else contain media which have a higher hydraulic conductivity than the groundwater which creates flow funneling of the groundwater through the horizontal wells. The exterior surfaces of the horizontal wells are clad such that they are impermeable to the source area of contamination, thus shielding the groundwater flowing through the horizontal wells from the contaminated source area.

FIG. 1 provides an illustration of a HRX well system according to one embodiment of the invention. HRX well system 100 comprises a series of horizontal wells $110_i$ disposed within the flow of contaminated groundwater 120 of a plume 130 to be treated. Reactive media 140 are placed inside horizontal wells $110_i$. Horizontal well $110_i$ comprises an up-gradient filter $150_i$ and a down-gradient filter $160_i$ which allows contaminated groundwater 120 to flow through the horizontal well $110_i$ where it is treated by reactive media 140. Horizontal well $110_i$ further comprises a sandpack $105_i$ that may be prepacked or may be allowed to form after installation. Horizontal well $110_i$ yet further comprises an up-gradient section $115_i$ disposed at an angle in relation to ground surface 145; a middle section $125_i$ substantially parallel to the flow of the contaminated groundwater 120; and a down-gradient section $135_i$ disposed at an angle in relation to ground surface 145. Pump 170 may optionally be disposed within horizontal well $110_i$ to increase the flow of groundwater 120 into horizontal well $110_i$.

Figure 2:
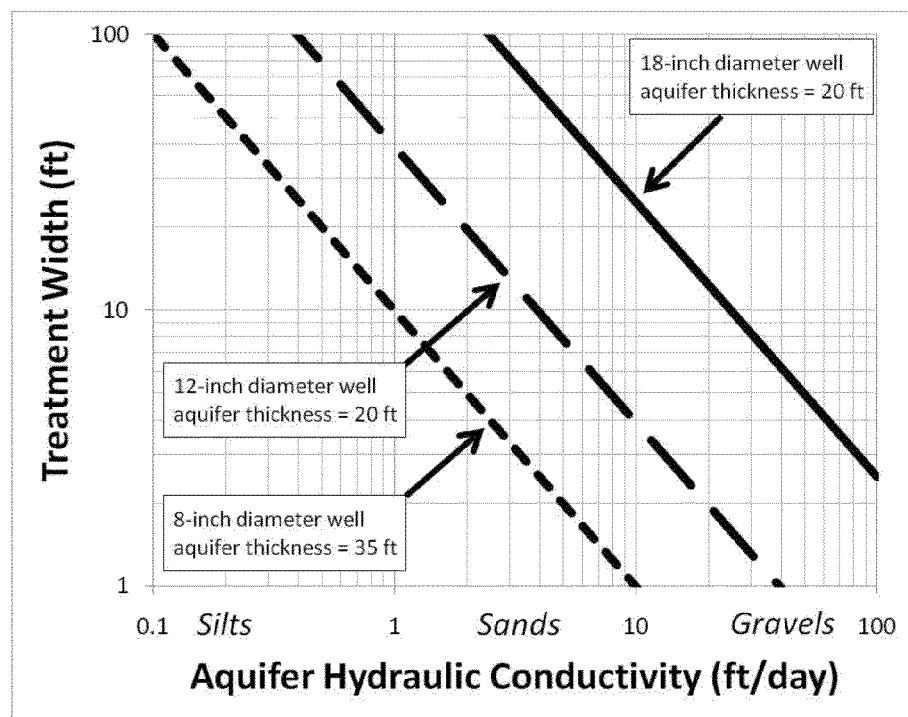
FIG. 2 depicts a comparison of calculated treatment widths for individual HRX wells with varying pipe diameters oriented parallel to groundwater flow direction for aquifers of varying hydraulic conductivity.

FIG. 2 depicts a comparison of calculated treatment widths for individual HRX wells oriented parallel to groundwater flow direction for aquifers of varying hydraulic conductivity. The results demonstrate that the average treatment width is sensitive to well diameter and impacted aquifer thickness. These results are based on passive operation which relies on flow focusing due to the engineered permeability contrast; however, hydraulic capture and treatment width could be significantly increased by installing a pump with the intake at the up-gradient end of the horizontal well and the pumped water pushed through reactive media within the horizontal well (i.e., no effluent is brought to land surface).

Equation 2 and the calculated treatment widths shown in FIG. 2 provide initial insight to HRX well performance; however, they ignore the vertical flow component and do not provide a three-dimensional representation of performance. Therefore, a numerical groundwater flow and contaminant transport model was used to assess the effectiveness of horizontal treatment wells as flow-focusing features for several possible well configurations under a variety of groundwater flow conditions. The main objective of the modeling was to assess the well performance metrics (contaminant mass treated and reduction of down-gradient mass discharge) as a function of the permeability (hydraulic conductivity) contrast between the reactive media in the horizontal well and the surrounding formation; of the flow field orientation with respect to the well orientation; and of the required reactive media residence times.

Simulations were performed using MODFLOW, a three-dimensional numerical groundwater flow model. In addition, the modeling codes MODPATH and MT3DMS were used to delineate groundwater flow paths and to simulate the migration and treatment of dissolved-phase contaminants. MODFLOW and associated companion codes simulate all relevant physical processes that control the migration of contaminants in saturated groundwater flow systems. Environmental Visualization System (EVS) was used to generate the enhanced three-dimensional visualizations of select numerical modeling simulations to further support interpretation and effective communication of quantitative model output.

Figure 3A:
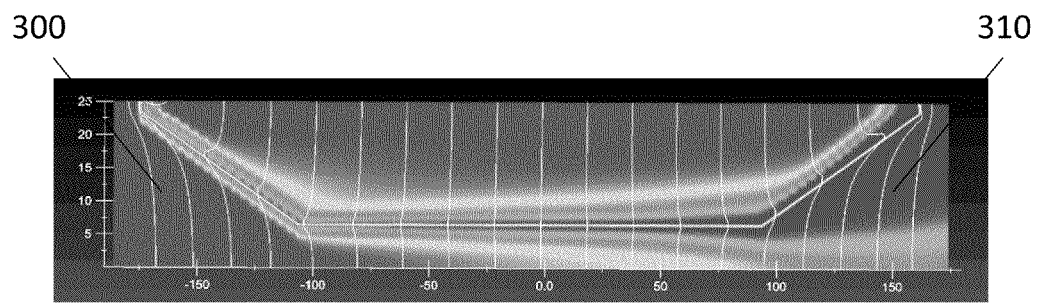
FIG. 3A depicts a cross-sectional view of an example model output including a HRX well system configuration, simulated groundwater elevation contours, and simulated concentrations of a representative contaminant plume.

FIG. 3A depicts a cross-sectional view of an example model output including a HRX well system configuration, simulated groundwater elevation contours, and simulated concentrations of a representative simulation. Untreated groundwater is shown at 300, while treated groundwater after flowing through the HRX well is shown at 310.

Figure 3B:
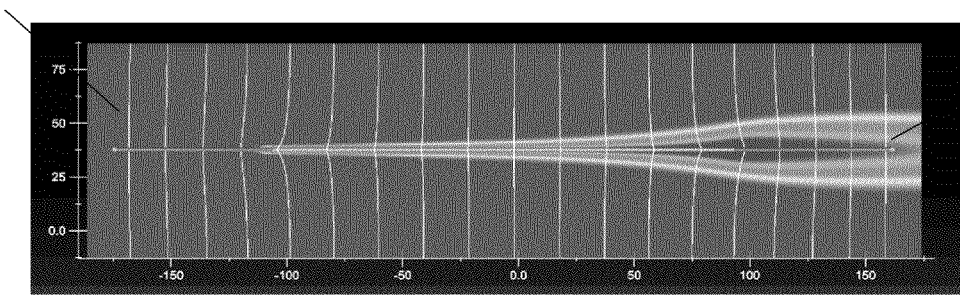
FIGS. 3B and 3C depict 3-dimensional model output (groundwater elevations and contaminant concentration distributions) in plan-view showing treated water exiting a HRX well system at the end of a 900-day simulation for parallel flow conditions according to one embodiment of the invention.
Figure 3C:
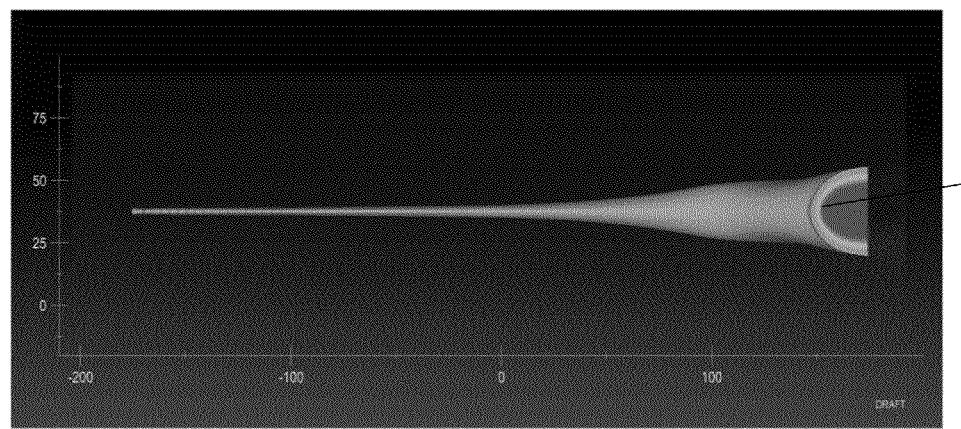

FIGS. 3B and 3C depict 3-dimensional model results of a plan view of treated water exiting a HRX well at the end of a 900-day simulation for parallel flow conditions according to one embodiment of the invention. In FIG. 3B, background 320 represents untreated water and treated water is shown at 330. In FIG. 3C, treated water volume is seen at 340. These figures show the variation in the distribution of treated water discharged from a HRX well in three dimensions. The model results confirm the treatment widths indicated by Equation 2 and demonstrate that significant contaminant concentration and mass discharge reductions occur almost immediately upon initial contact with the HRX well. In just over one week, concentration of contaminants is calculated to be reduced by an order of magnitude down-gradient of the HRX well.

Figure 4A:
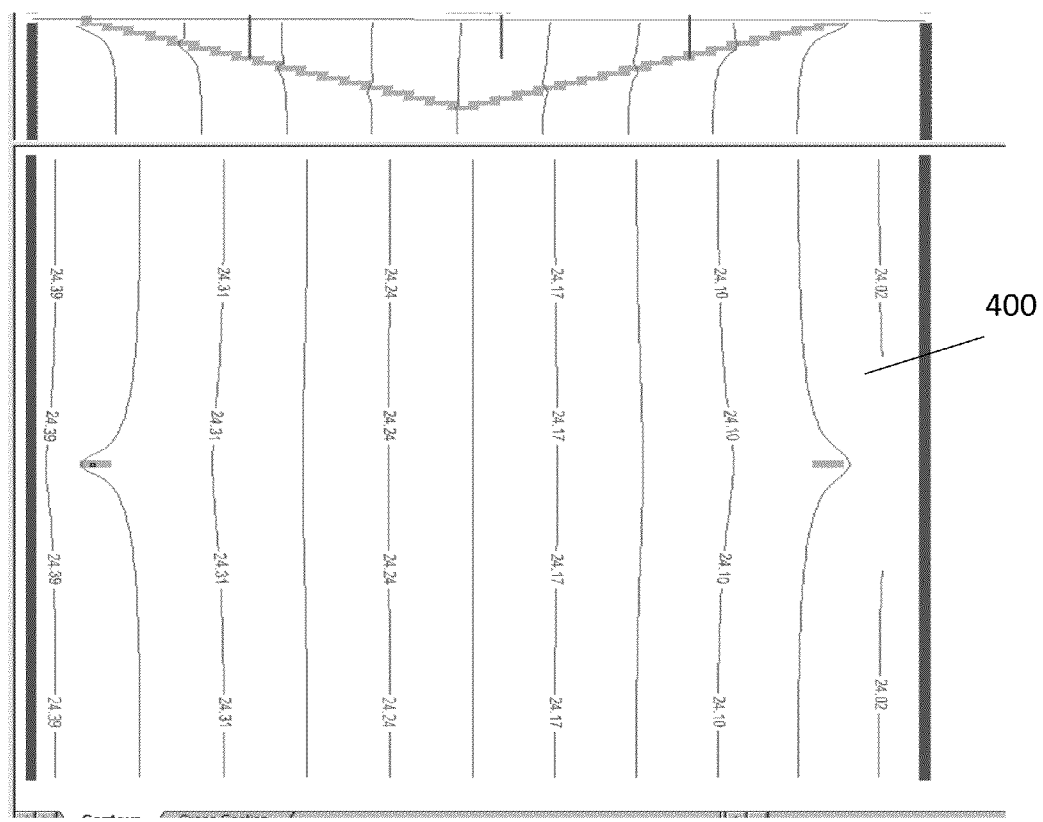
FIG. 4A is a side-view (top portion) and a plan-view (bottom portion) depiction from a 3-dimensional numerical model output of the predicted potentiometric groundwater elevation caused by a HRX well system having a total length of 70 feet and hydraulic conductivity at a ratio of 100:1 for the reactive media within the well compared to the average hydraulic conductivity of the aquifer.

FIG. 4A is a side-view (top portion) and a plan-view (bottom portion) depiction from a 3-dimensional numerical model output of the predicted potentiometric groundwater elevation and flowfield 400 caused by the HRX well. The HRX well comprises two sections forming a "V" shape and together totaling 70 feet in length, where the hydraulic conductivity of the reactive media within the well to the average hydraulic conductivity of the aquifer (plume) is 100:1. In this simulation, aquifer thickness=25 ft.; groundwater velocity in the aquifer (plume)=0.13 ft/day; and groundwater velocity in the HRX well=8 ft/day.

Figure 4B:
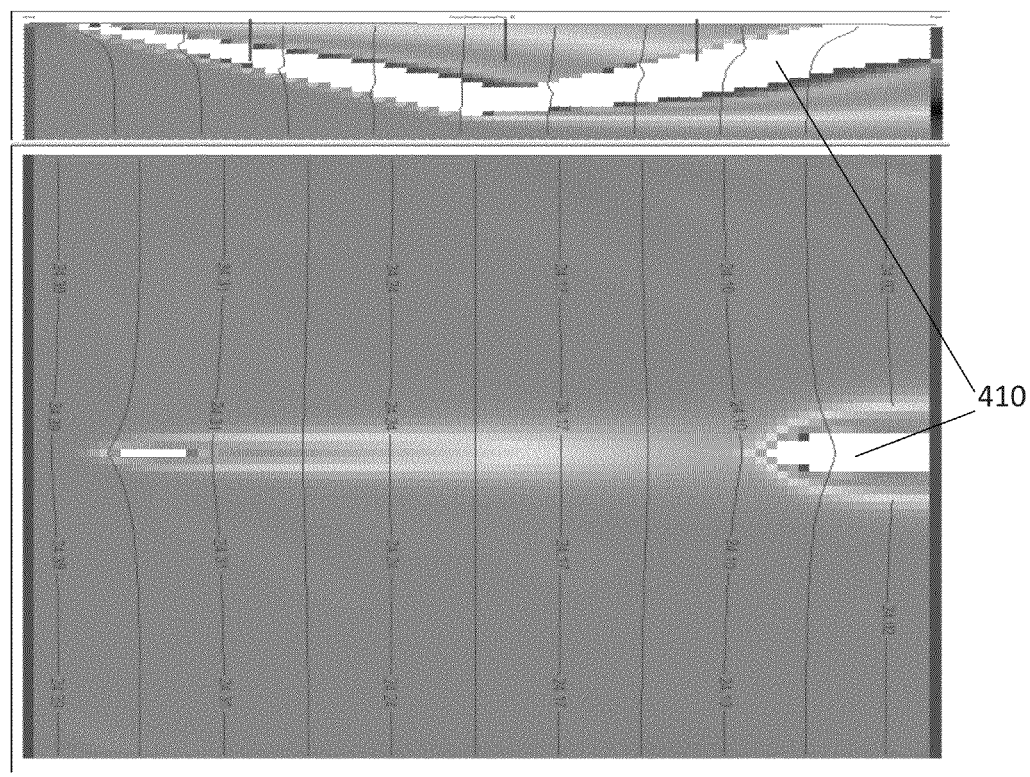
FIG. 4B is a side-view (top portion) and a plan-view (bottom portion) depiction of the predicted treatment area of the HRX well system of FIG. 4A after 1 year.

FIG. 4B depicts 3-dimensional numerical model results of the HRX well shown in FIG. 4A after 1 year. This graph is a side-view (top portion) and a plan-view (bottom portion) depiction of the predicted treatment area 410 of the HRX well.

Figure 5A:
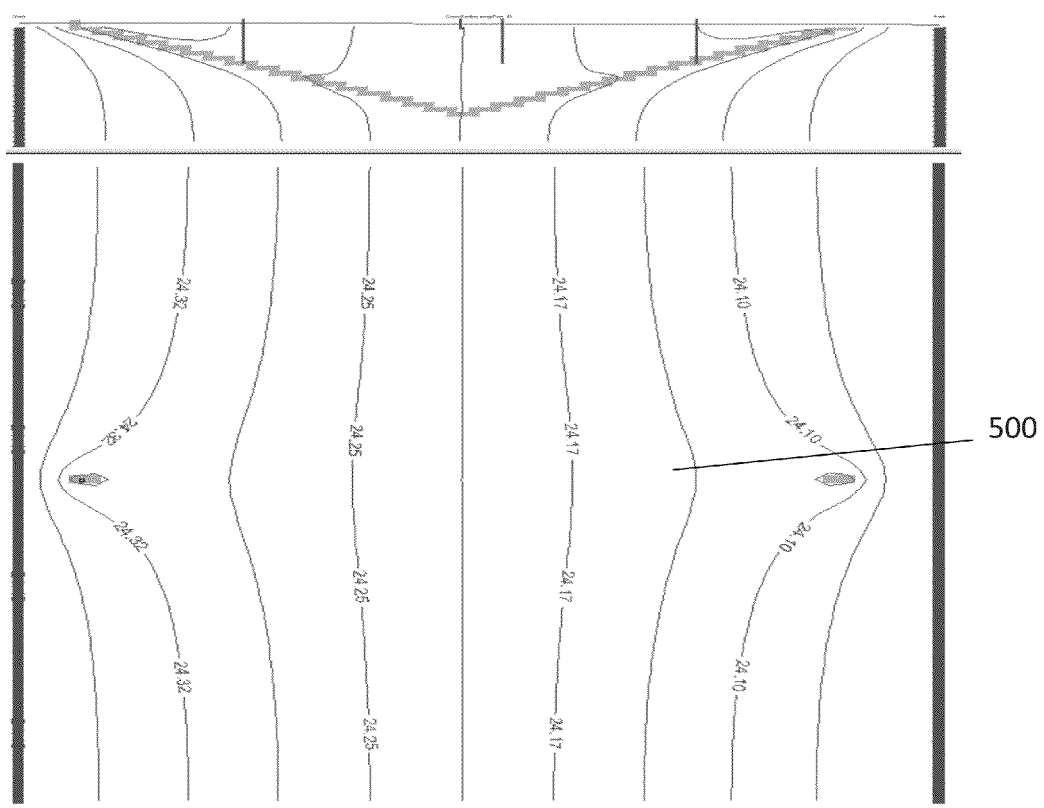
FIG. 5A is a side-view (top portion) and a plan-view (bottom portion) depiction from a 3-dimensional numerical model output of the predicted potentiometric groundwater elevation caused by a HRX well system having a total length of 70 feet and hydraulic conductivity at a ratio of 1000:1 for the reactive media within the well compared to the average hydraulic conductivity of the aquifer.

FIG. 5A is a side-view (top portion) and a plan-view (bottom portion) depiction from a 3-dimensional numerical model output of the predicted potentiometric groundwater elevation and flowfield 500 caused by the HRX well. The HRX well comprises two sections forming a "V" shape and together totaling 70 feet in length, where the hydraulic conductivity of the reactive media within the well to the average hydraulic conductivity of the aquifer (plume) is 1000:1. In this simulation, aquifer thickness=25 ft.; groundwater velocity in the aquifer (plume)=0.13 ft/day; and groundwater velocity in the HRX well=42 ft/day. As compared to the simulation conditions used to generate FIG. 4A, there is a greater effect on the groundwater flowfield and the treatment width is greater.

Figure 5B:
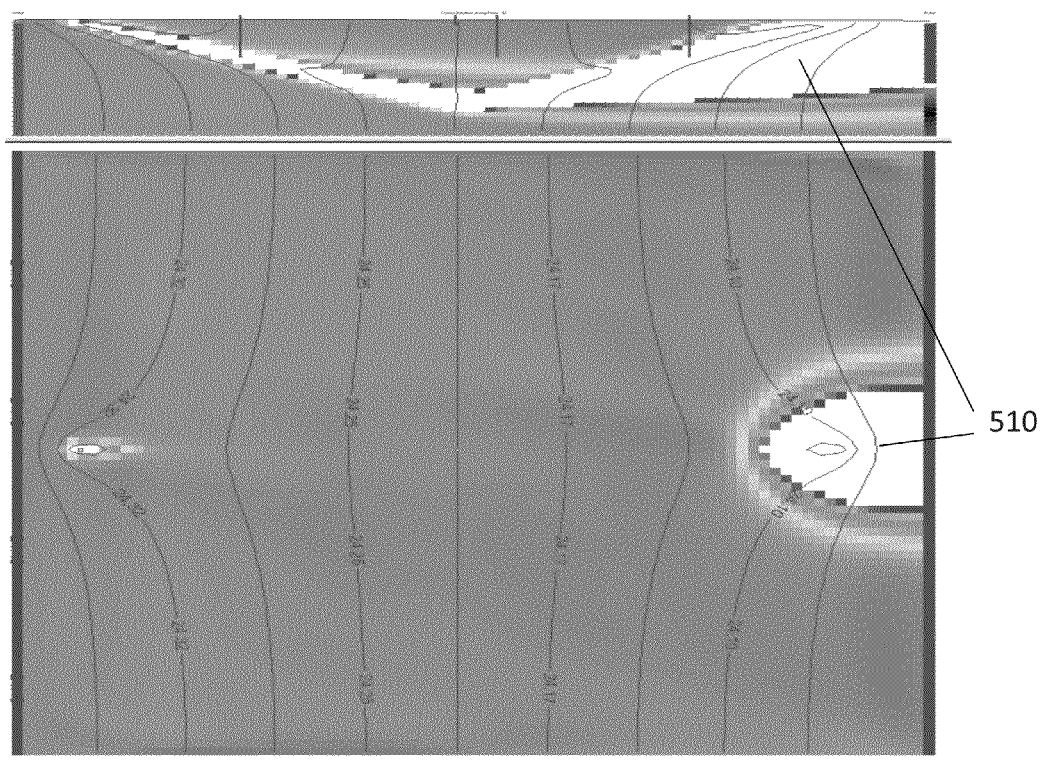
FIG. 5B is a plan-view depiction of the predicted treatment area of the HRX well system of FIG. 5A after 1 year.

FIG. 5B depicts 3-dimensional numerical model results of the HRX well shown in FIG. 5A after 1 year. This graph is a side-view (top portion) and a plan-view (bottom portion) depiction of the predicted treatment area 510 of the HRX well. As compared to the simulation conditions used to generate FIG. 4B, there is a greater effect on the groundwater flowfield 500 and the treatment width is greater.

Figure 6A:
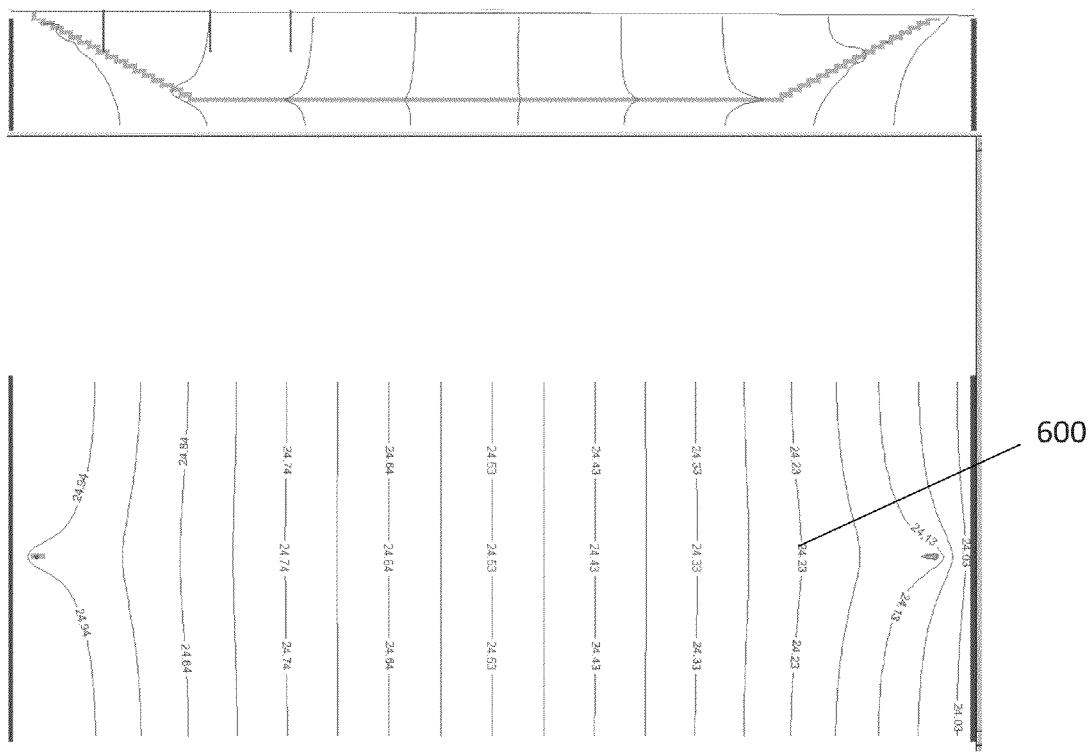
FIG. 6A is a side-view (top portion) and a plan-view (bottom portion) depiction from a 3-dimensional numerical model output of the predicted potentiometric groundwater elevation caused by a HRX well system having a horizontal (flat bottom) length of 200 feet and hydraulic conductivity at a ratio of 1000:1 for the reactive media within the well compared to the average hydraulic conductivity of the aquifer.

FIG. 6A is a side-view (top portion) and a plan-view (bottom portion) depiction from a 3-dimensional numerical model output of the predicted potentiometric groundwater elevation and flowfield 600 caused by the HRX well. The HRX well comprises three sections comprising two sections disposed at an angle to the ground surface and one 200 foot long section disposed substantially horizontal to the ground surface and the flow of contaminated groundwater within the aquifer or plume, where the hydraulic conductivity of the reactive media within the well to the average hydraulic conductivity of the aquifer (plume) is 1000:1. In this simulation, aquifer thickness=25 ft.; groundwater velocity in the aquifer (plume)=0.13 ft/day; and groundwater velocity in the HRX well=100 ft/day. As compared to the simulation conditions used to generate FIG. 5A, the well geometry is different, resulting in changes to the groundwater flowfield 600.

Figure 6B:
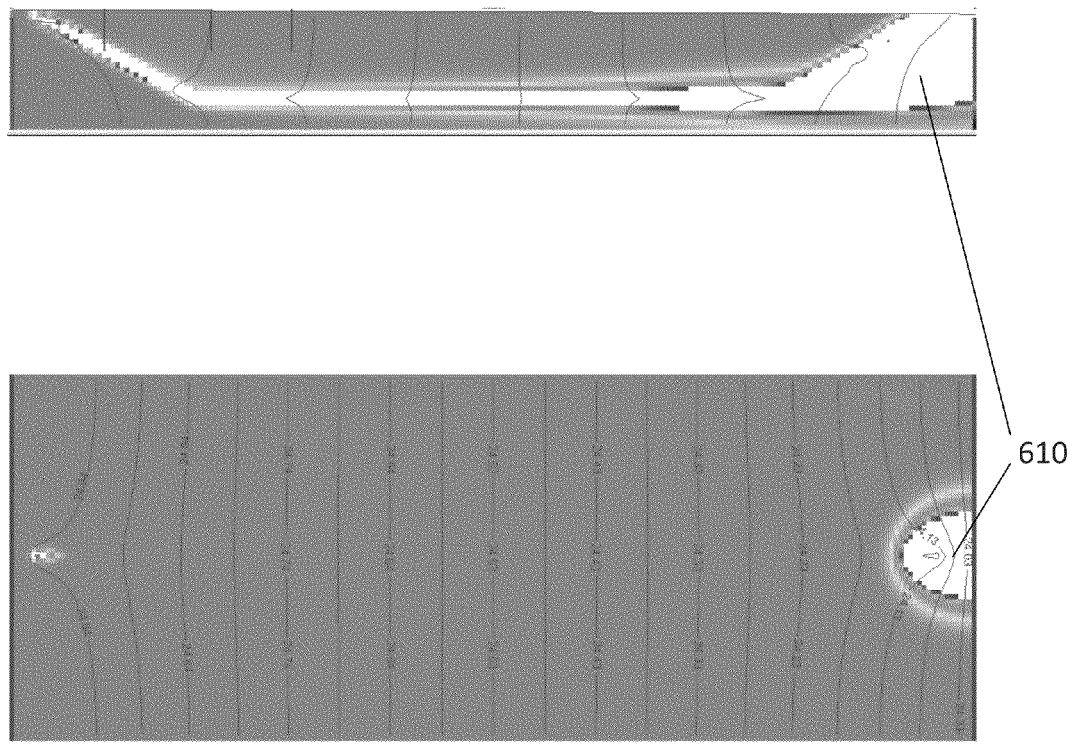
FIG. 6B is a side-view (top portion) and a plan-view (bottom portion) depiction of the predicted treatment area of the HRX well system of FIG. 6A after 1 year.

FIG. 6B depicts 3-dimensional numerical model results of the HRX well shown in FIG. 6A after 1 year. This graph is a plan-view depiction of the predicted treatment area 610 of the HRX well. As compared to the simulation conditions used to generate FIG. 5B, the effects on the groundwater flowfield 600 and HRX well treatment zone are somewhat different.

Figure 7:
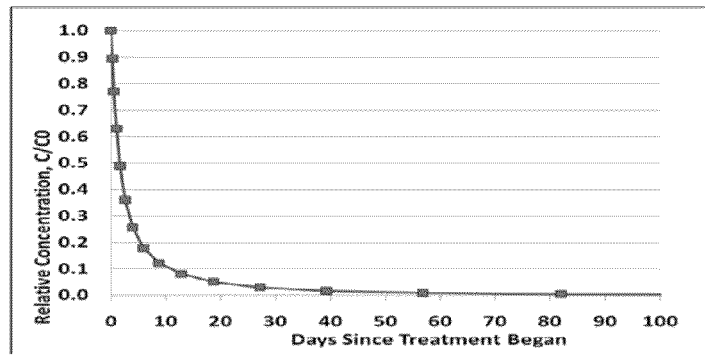
FIG. 7 depicts predicted relative contaminant concentration versus time downstream of an HRX well system for well orientation parallel to the general groundwater flow direction.

FIG. 7 depicts predicted relative contaminant concentration versus time downstream of an example HRX well for a well orientation parallel to the general groundwater flow direction.

Figures 8A, 8B, 8C, 8D:
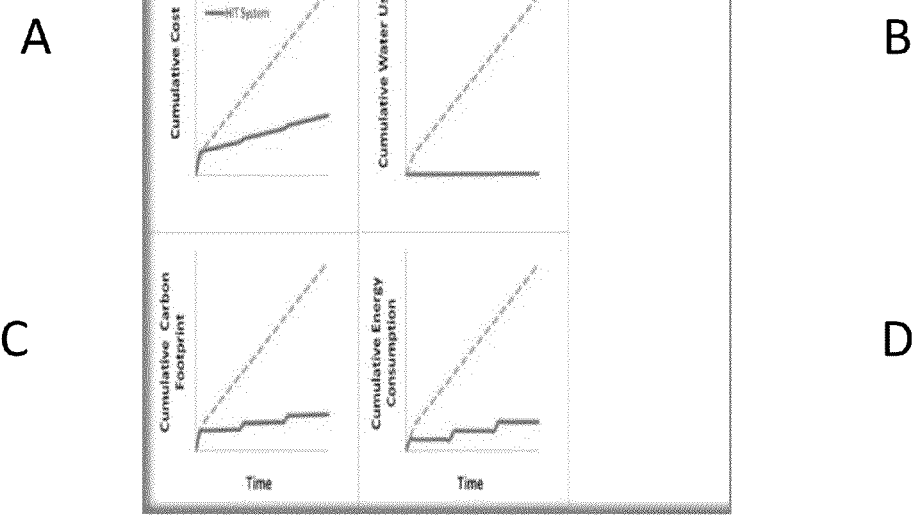
FIG. 8A conceptually depicts the cumulative cost of a HRX well system compared to a pump-and-treat system over time.
FIG. 8B conceptually depicts the cumulative water use of a HRX well system compared to a pump-and-treat system over time.
FIG. 8C conceptually depicts the cumulative carbon footprint of a HRX well system compared to a pump-and-treat system over time.
FIG. 8D conceptually depicts the cumulative energy consumption of a HRX well system compared to a pump-and-treat system over time.

FIG. 8A conceptually depicts the cumulative cost of an example HRX well system compared to a pump-and-treat system over time; FIG. 8B conceptually depicts the cumulative water use of a HRX well system compared to a pump-and-treat system over time; FIG. 8C conceptually depicts the cumulative carbon footprint of a HRX well system compared to a pump-and-treat system over time; and FIG. 8D conceptually depicts the cumulative energy consumption of a HRX well system compared to a pump-and-treat system over time.

Figure 9:
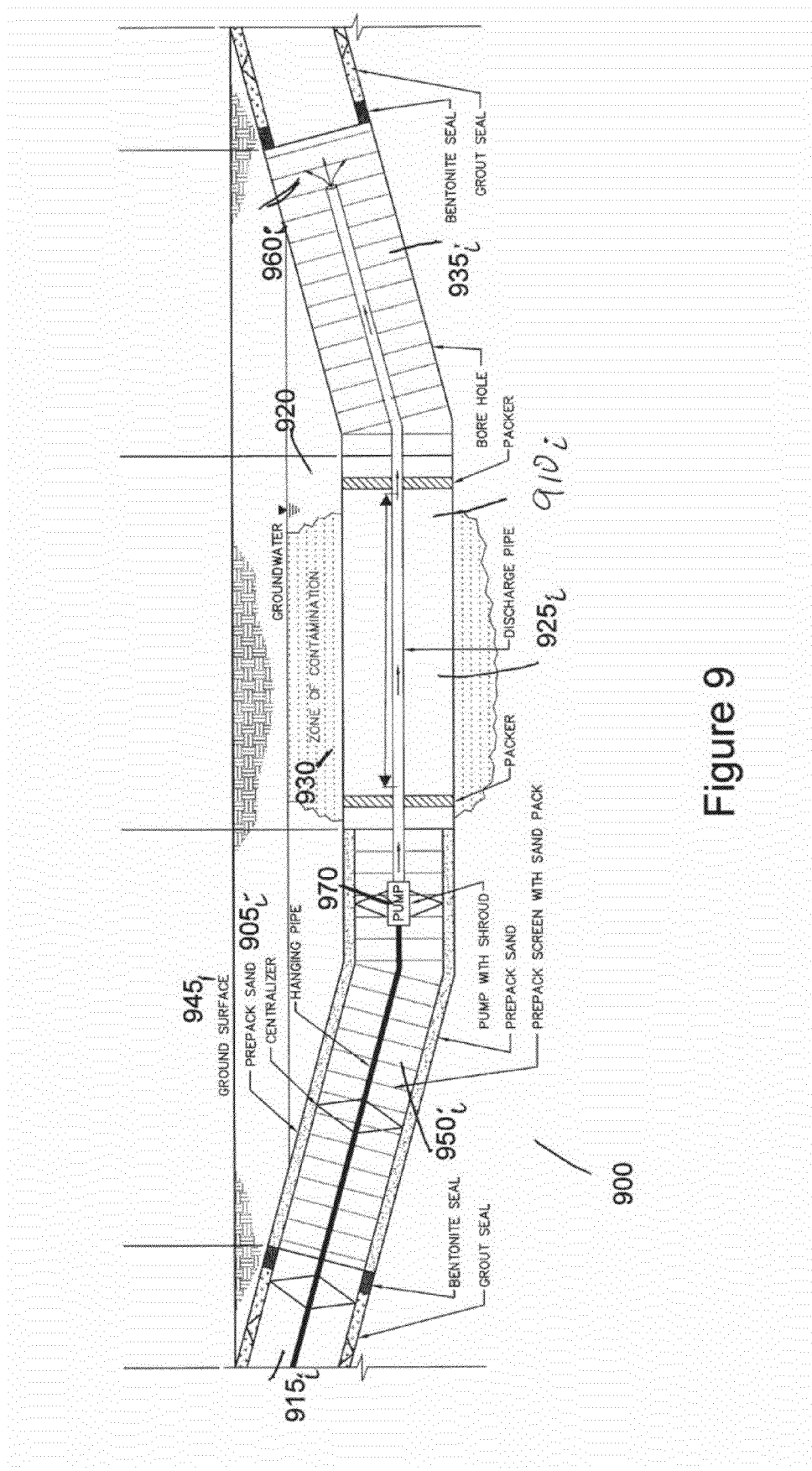
FIG. 9 provides an illustration of a SAB system according to one embodiment of the invention.

FIG. 9 provides an illustration of a SAB system according to one embodiment of the invention. SAB system 900 comprises a series of horizontal wells $910_i$ disposed in a manner to allow unimpacted or cleaner groundwater 920 to bypass a non-aqueous phase liquid (NAPL) zone or high-concentration source area of contamination 930 and discharge down-gradient of the contamination area 930. Reactive media (not shown) may be placed inside horizontal well $910_i$. Horizontal well $910_i$ comprises an up-gradient filter $950_i$ and a down-gradient filter $960_i$ and is clad such that it is impermeable to the non-aqueous phase liquid (NAPL) zone or high-concentration source area of contamination 930. Horizontal well $910_i$ further comprises a sandpack $905_i$ that may be prepacked or may be allowed to form after installation. Horizontal well $910_i$ yet further comprises an up-gradient section $915_i$ disposed at an angle in relation to ground surface 945; a middle section $925_i$ substantially parallel to the flow of the unimpacted or cleaner groundwater 920; and a down-gradient section $935_i$ disposed at an angle in relation to ground surface 945. Pump 970 may optionally be disposed within horizontal well 910, to increase the flow of groundwater 920 into horizontal well 910,.

The foregoing embodiments have been presented for the purpose of illustration and description only and are not to be construed as limiting the scope of the invention in any way.

The invention claimed is:

1. A method for in situ remediation, comprising:

identifying an aquifer to be remediated;

determining site qualities of the aquifer, including average hydraulic conductivity and the rate and direction of flow of contaminated groundwater through the aquifer;

drilling a plurality of boreholes from the ground surface into the aquifer;

forming a plurality of wells by inserting a plurality of well pipes into the boreholes, wherein at least one part of one well pipe is disposed substantially horizontal to contaminated groundwater flow with respect to vertical and parallel to contaminated groundwater flow when viewed from the ground surface, wherein further at least one well pipe comprises a first section and a second section, wherein the first section comprises a first filter portion and a solid wall portion which is substantially permeable to groundwater flow, wherein the first filter portion is situated up-gradient of the flow of the contaminated groundwater; and the second section comprises a second filter portion and a solid wall portion which is substantially permeable to groundwater flow, wherein the second filter portion is situated down-gradient of the flow of the contaminated groundwater; and thereafter emplacing reactive media into the interior of the well pipes, wherein the hydraulic conductivity of the reactive media situated in the interior of the well pipes is greater than the average hydraulic conductivity of the aquifer, wherein a portion of the flowing contaminated groundwater funnels into the well pipes through the first filter of the first section, and exits through the second filter of the second section, and wherein further the contaminated groundwater is treated by the reactive media as it passes through the interior of the well pipes.

2. The method of claim 1 wherein the reactive media comprises ZVI, ZVI plus Pt, ZVI plus Pd, ZVI plus Ni, GAC, ion exchange resins, zeolite, phosphates, magnetite, molecular sieve, mulch, apatite, limestone, magnesium oxide, reactive sulfides or any combination thereof.

3. The method of claim 1, wherein the well pipes comprise a diameter of 8 to 18 inches, or greater.

4. The method of claim 3, wherein the well pipes comprise PVC.

5. The method of claim 1, wherein the ratio of the differential in the hydraulic conductivity of the reactive media place in the interior of the well pipes compared to the hydraulic conductivity of the flowing contaminated groundwater is approximately 100:1.

6. The method of claim 5, wherein the ratio of the differential in the hydraulic conductivity of the reactive media place in the interior of the well pipes compared to the hydraulic conductivity of the flowing contaminated groundwater is approximately 1000:1.

7. The method of claim 1, further comprising a pump disposed in the first section configured to draw groundwater into the interior of the well pipe through the first filter.

8. The method of claim 7, wherein further the first section and the second section of the well pipes are disposed substantially to form a "V" or "U" shaped well.

9. The method of claim 8, wherein the first section and the second section together are approximately 70 feet in length.

10. The method of claim 7, wherein at least one well pipe comprises a first section, a second section and a third section of well pipe, wherein the third section is disposed between the first section and the second section, wherein further the third section is disposed substantially horizontal to the flow of groundwater in the aquifer or plume.

11. The method of claim 10, wherein the third section comprises a solid section substantially impermeable to contaminated groundwater or other environmental effects.

12. The method of claim 11, wherein the third section of the well pipe is approximately 200 feet in length.

13. The method of claim 1, further comprising designing the size of well pipes, the depth and placement of the well pipes and the reactive media to be placed in the interior of the well pipes based on aquifer treatment width; total contaminant mass in the aquifer to be treated; and contaminant concentration and desired contaminated mass reduction downgradient of the aquifer.

14. The method of claim 13, wherein the aquifer treatment width comprises 1 to 100 feet per well.

15. The method of claim 14, wherein the aquifer treatment width comprises 20 to 35 feet.

16. The method of claim 1, wherein the relative concentration of contaminants in the groundwater down-gradient of the well pipes is reduced by approximately 90% within 10 days of the start of treatment.

17. The method of claim 16, wherein the relative concentration of contaminants in the groundwater down-gradient of the well pipes is reduced by approximately 90% within 7 days of the start of treatment.

18. A method for bypassing the flow of unimpacted groundwater around a source area of contamination comprising:

identifying a source area of contamination and an aquifer proximate the source area of contamination;

determining site qualities of the aquifer, including average hydraulic conductivity and the rate and direction of flow of groundwater through the aquifer;

drilling a plurality of boreholes from the ground surface to a depth between the aquifer and the source area of contamination;

forming a plurality of wells by inserting a plurality of well pipes into the boreholes, wherein at least one well pipe comprises a first section and a second section, wherein the first section comprises a first filter portion and a solid wall portion which is substantially permeable to groundwater flow, wherein the first filter portion is situated up-gradient of the flow of the contaminated groundwater; and the second section comprises a second filter portion and a solid wall portion which is substantially permeable to groundwater flow, wherein the second filter portion is situated down-gradient of the flow of the contaminated groundwater; and wherein the hydraulic conductivity of the interior of the well pipes is greater than the average hydraulic conductivity of the aquifer, wherein a portion of the flowing groundwater funnels into the well pipes through the first filter of the first section, passes through the interior of the well pipes and exits through the second filter, wherein further the groundwater remains unimpacted by the contamination in the source area.

* * * * *